July 8, 1930.  C. W. DAKE ET AL  1,770,262
INSULATED ELECTRIC ROTOR
Filed May 23, 1927
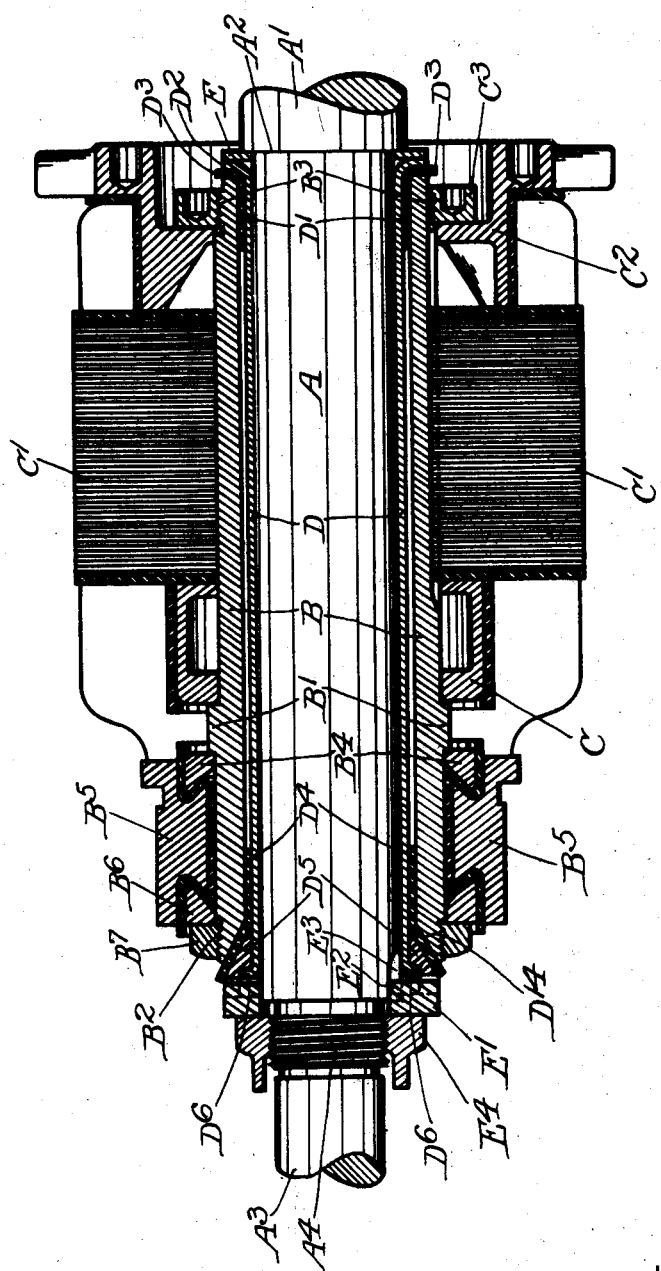
INVENTORS
John J. Kennedy
Charles W. Dake
by
ATTORNEYS.

Patented July 8, 1930

1,770,262

UNITED STATES PATENT OFFICE

CHARLES W. DAKE AND JOHN J. KENNEDY, OF CHICAGO, ILLINOIS, ASSIGNORS TO THE PYLE-NATIONAL COMPANY, OF CHICAGO, ILLINOIS, A CORPORATION OF NEW JERSEY

INSULATED ELECTRIC ROTOR

Application filed May 23, 1927. Serial No. 193,497.

Our invention relates to improvements in insulated electric rotors and has for one object to provide a new and improved type of rotor wherein both the commutator and the armature are insulated as a unit from the shaft thereby preventing eddy currents, short circuits and the like. Other objects will appear from time to time in the specification and claims.

Our invention is illustrated more or less diagrammatically in the accompanying drawings, wherein is shown a longitudinal section with a shaft in elevation through the rotor.

Like parts are indicated by like characters throughout the several figures.

A is the shaft. It has an enlarged end $A^1$, there being a shoulder $A^2$ between the main portion of the shaft and the enlarged end. The shaft is reduced at $A^3$ and threaded at $A^4$, the diameter of the reduced portion being less than the diameter of the thread, the diameter of the thread being less than the portion A.

B is a supporting sleeve. It has an enlarged integral collar $B^1$ intermediate its ends and is threaded at both ends at $B^2$ and $B^3$. $B^4$ is a commutator holding collar abutting against one side of the collar $B^1$. $B^5$ are commutator segments insulated from the collar $B^4$ and from the sleeve B as indicated. $B^6$ is a second commutator bar holding collar likewise insulated from the commutator bars or segments $B^5$. $B^7$ is a nut on the threaded end of the sleeve B adapted to laterally compress the collars $B^4$ and $B^6$ and hold between them the commutator bars $B^5$ to maintain the commutator as a unit on the sleeve B.

C is a spacing collar on the sleeve B. It abuts the opposite side of the integral collar $B^1$ and is insulated from the armature $C^1$. $C^2$ is a collar slidable along the sleeve B, abutting and insulated from the opposed side of the armature $C^1$ and adapted to be compressed against the armature and the collar C by means of the nut $C^3$ on the threaded portion of the shaft $B^3$.

D is a sleeve inside and out of contact with and concentric with the sleeve B. $D^1$ is an insulating sleeve of mica or other suitable material interposed between one end of the sleeve B and the adjacent end of the sleeve D. This sleeve D is beaded out as at $D^2$ so as to give a flange perpendicular to the axis of the shaft. The mica or insulating sleeve is outwardly flanged at $D^3$ and projects as indicated beyond the periphery of the shaft $D^2$ where it engages the end thereof to insure insulation between the sleeves B and D at that end. $D^4$ is an insulating sleeve between the sleeves B and D at the other end. At this end, it will be noted that the sleeve B is chamfered at $D^{14}$. A tapered centering ring $D^5$ rides on the sleeve D and is insulated from the chambered portion $D^{14}$ by means of a flared extension from the sleeve $D^4$ and the sleeve D is beaded out at $D^6$ to hold the parts together. This arrangement gives a sleeve insulated from and inside the main commutator and armature carrying sleeve, which sleeve is concentric therewith and makes a snug ring fit on the shaft A.

E is a stub collar on the shaft A resting against the shoulder $A^2$ and engaging the flared or beaded out end $D^2$ of the sleeve D. $E^1$ is a drive ring having an integral spline $E^2$ engaging the keyway $E^3$ in the shaft A and held against rotation with respect to the sleeves B and D by means not here shown. $E^4$ is a nut engaging the threaded portion of the shaft $A^4$ adapted to engage the drive ring $E^1$ and force the rotor assembly longitudinally against the shoulder $A^2$ to hold the parts in position.

We claim:

1. In combination with an electric rotor comprising an armature and a commutator, a sleeve upon which they are both permanently fixed in position, a shaft upon which the sleeve is mounted for rotation therewith, an interior sleeve between the shaft and the main supporting sleeve and insulating collars interposed between the ends of the two sleeves.

2. In combination with an electric rotor comprising an armature and a commutator, a sleeve upon which they are both permanently fixed in position, a shaft upon which the sleeve is mounted for rotation therewith, an interior sleeve between the shaft and the main supporting sleeve and insulating collars interposed between the ends of the two sleeves, means for centering the outer sleeve on the inner one.

3. In combination with an electric rotor comprising an armature and a commutator, a sleeve upon which they are both permanently fixed in position, a shaft upon which the sleeve is mounted for rotation therewith, an interior sleeve between the shaft and the main supporting sleeve and insulating collars interposed between the ends of the two sleeves, means for centering the outer sleeve on the inner one, the inner sleeve being beaded over at each end to lock the outer sleeve in place thereon.

4. In an electric machine, a sleeve, a shoulder intermediate its ends, a commutator on the sleeve insulated therefrom, a nut threaded on the sleeve and adapted to lock the commutator against said shoulder, an armature on the sleeve, a spacing collar interposed between the armature and the shoulder, a ring engaging the armature slidable on the sleeve, a nut threaded on the sleeve adapted to lock the ring, the armature and the spacing ring together against the shoulder.

5. In an electric machine, a sleeve, a shoulder intermediate its ends, a commutator on the sleeve insulated therefrom, a nut threaded on the sleeve and adapted to lock the commutator against said shoulder, an armature on the sleeve, a spacing collar interposed between the armature and the shoulder, a ring engaging the armature slidable on the sleeve, a nut threaded on the sleeve adapted to lock the ring, the armature and the spacing ring together against the shoulder, insulating means interposed between the nut and the shoulder associated with the commutator and the sleeve and insulating means interposed between the two rings and the armature.

6. In an electric machine, a sleeve, a commutator and an armature rigidly mounted thereon, a second sleeve concentric with the first mentioned sleeve, insulating sleeves interposed between the two said sleeves adjacent their ends, said insulating sleeves being outwardly flared at the ends adjacent the ends of the two sleeves, the inner sleeve being outwardly expanded against said flared insulating sleeve ends to lock the two sleeves and the insulating sleeves in fixed relation.

Signed at Chicago, county of Cook, and State of Illinois, this 18th day of May, 1927.

CHARLES W. DAKE.
JOHN J. KENNEDY.